United States Patent
Matthae et al.

(10) Patent No.: US 7,268,953 B2
(45) Date of Patent: Sep. 11, 2007

(54) APOCHROMATICALLY CORRECTED MICROSCOPE OBJECTIVE

(75) Inventors: Manfred Matthae, Jena (DE); Werner Kleinschmidt, Adelebsen (DE); Georg Herbst, Goettingen (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 11/448,592

(22) Filed: Jun. 7, 2006

(65) Prior Publication Data

US 2006/0279847 A1    Dec. 14, 2006

(30) Foreign Application Priority Data

Jun. 10, 2005   (DE) ...................... 10 2005 027 423

(51) Int. Cl.
    *G02B 21/02*    (2006.01)
(52) U.S. Cl. .................................................... 359/656
(58) Field of Classification Search ......... 359/656–661
    See application file for complete search history.

(56) References Cited

U.S. PATENT DOCUMENTS

| 5,517,360 | A | * | 5/1996 | Suzuki | .................... 359/658 |
| 5,659,425 | A |   | 8/1997 | Suzuki |  |
| 6,181,480 | B1 | * | 1/2001 | Ito | ........................... 359/656 |

* cited by examiner

*Primary Examiner*—Scott J. Sugarman
*Assistant Examiner*—Darryl J. Collins
(74) *Attorney, Agent, or Firm*—Patterson, Thuente, Skaar & Christensen, P.A.

(57) ABSTRACT

A microscope objective with high aperture, large object field and apochromatic correction in the wavelength range from ultraviolet to infrared. The microscope objective includes, starting from the object level: a first group of lenses with overall positive refraction power, including a cemented group with positive-negative refraction power effect, made out of one of two lenses, and of a further lens with positive refraction power, a second group of lenses with positive refraction power, including three cemented lenses, a third group of lenses with negative refraction power, including three cemented lenses, in which the side that faces the image plane is convex, a fourth group of lenses, consisting of a lens with positive refraction power and a cemented group of two lenses with positive-negative refraction power, and a fifth group of lenses, including two lenses in a cemented group with negative-positive refraction power.

6 Claims, 1 Drawing Sheet

APOCHROMATICALLY CORRECTED MICROSCOPE OBJECTIVE

RELATED APPLICATION

The current application claims the benefit of priority to German Patent Application No. 10 2005 027 423.4 filed on Jun. 10, 2005. Said application is incorporated by reference herein.

FIELD OF THE INVENTION

The invention relates to a microscope objective with high aperture, large object field with apochromatic correction in a wavelength range of 365 nm (ultraviolet) to 850 nm (infrared).

BACKGROUND OF THE INVENTION

The efficiency of a microscope depends primarily on the performance data and the correction quality of the microscope objective. For efficiency is affected by, for example, the aperture (resolution), the object field (the size of the intermediate image divided by the object magnification) as well as the spectral range for which the microscope objective is usable. The correction quality may usually be defined by data such as smoothing and color correction.

So far microscope objectives with apochromatic correction are only available for relatively small spectral regions, such as for example only for the visual spectrum, for spectral regions of ultraviolet to visible, or from visible to infrared. However, the newest microscopy techniques, in particular, fluorescent microscopy, require being able to work in the visible, ultraviolet and infrared wavelength ranges without having to change the microscope objective.

Such an objective is described in the U.S. Pat. No. 5,659,425, which is apochromatically corrected, however likewise only for a relatively small spectral region. In addition, the object field seizing with this objective is too small for many interesting applications due to the high object magnification.

SUMMARY OF THE INVENTION

Because of this, the purpose of the invention is based on creating a microscope objective with high aperture and large object field, which can be used from the ultraviolet to the infrared spectral regions.

The microscope objective, according to the invention, includes, starting from the object level:
  a first group of lenses (G1) with overall positive refraction power, having
  a cemented group with positive-negative refraction power effect, made out of one of two lenses (L1, L2), and of
  a further lens (L3) with positive refraction power,
  a second group of lenses (G2) with positive refraction power, consisting of three cemented lenses (L4, L5, L6),
  a third group of lenses (G3) with negative refraction power, consisting of three cemented lenses (L7, L8, L9), wherein the side that faces the image plane is convex,
  a fourth group of lenses (G4), consisting of a lens (L10) with positive refraction power and a cemented group of two lenses (L11, L12) with positive-negative refraction power, and
  a fifth group of lenses (G5), consisting of one of two lenses (L13, L14) from a cemented group with negative-positive refraction power.

The focal length of the group of lenses (G2) preferably should not be smaller than 15 mm, the focal length magnitude of the group of lenses (G3) should not be smaller than 20 mm, and the focal lengths magnitudes of the lenses (L5, L8) should not be larger than 20 mm in each case.

In a first embodiment, in which a microscope objective according to invention is arranged with radii r, thicknesses D and distances A indicated in following table is implemented in mm, refractive indices $n_e$ with a wavelength by 546.07 nm and Abbe number $v_e$, an aperture of 1.2 is attained with a working distance smaller or equal to 0.28 mm (plus the cover glass):

| Object level | r | D | A | $n_e$ | $v_e$ |
|---|---|---|---|---|---|
| G1 | | | | | |
| L1 | ∞ | 0.82 | | 1.46008 | 67.7 |
| | −0.892 | | | | |
| L2 | | 3.24 | | 1.88815 | 40.5 |
| | −3.351 | | | | |
| | | | 0.06 | | |
| L3 | −13.143 | 2.8 | | 1.53019 | 76.6 |
| | −5.957 | | | | |
| | | | 0.16 | | |
| G2 | | | | | |
| L4 | 11.965 | 6.15 | | 1.53430 | 48.6 |
| | −10.291 | | | | |
| L5 | | 0.95 | | 1.64132 | 42.2 |
| L6 | 18.566 | 3.87 | | 1.43985 | 94.5 |
| | −15.8495 | | | | |
| | | | 0.06 | | |
| G3 | | | | | |
| L7 | 46.9796 | 3.15 | | 1.43985 | 94.5 |
| | −12.496 | | | | |
| L8 | | 0.95 | | 1.73739 | 51.2 |
| L9 | 8.7856 | 5.18 | | 1.43985 | 94.5 |
| | −25.2995 | | | | |
| | | | 0.16 | | |
| G4 | | | | | |
| L10 | 11.8839 | 5.1 | | 1.45720 | 89.9 |
| | −43.0888 | | | | |
| | | | 0.122 | | |
| | 7.606 | | | | |
| L11 | | 5.95 | | 1.53019 | 76.6 |
| | −17.151 | | | | |
| L12 | | 0.9 | | 1.64132 | 42.2 |
| | 4.529 | | | | |
| | | | 5.196 | | |
| G5 | | | | | |
| | −4.598 | | | | |
| L13 | | 0.92 | | 1.62247 | 63.2 |
| | −10.82 | | | | |
| L14 | | 2.07 | | 1.62408 | 36.1 |
| | −6.2197 | | | | |
| | | | 126.8 | | |

In a second embodiment, with the following specified radii r, thicknesses D and distances A in mm, the refractive indices $n_e$ with a wavelength from 546.07 Nm and Abbe numbers $v_e$, the microscope objective according to the invention attains an aperture of 1.1 with a working distance smaller or equal to 0.62 mm (plus the cover glass).

| Object level | r | D | A | $n_e$ | $v_e$ |
|---|---|---|---|---|---|
| G1 | | | | | |
| L1 | ∞ | 0.86 | | 1.46008 | 67.7 |
| | −1.06 | | | | |
| L2 | | 3.7 | | 1.88815 | 40.5 |
| | −3.813 | | | | |
| | | | 0.06 | | |
| | −15.732 | | | | |
| L3 | | 2.8 | | 1.48794 | 84.1 |
| | −6.778 | | | | |
| | | | 0.16 | | |
| G2 | | | | | |
| | 13.046 | | | | |
| L4 | | 6 | | 1.53430 | 48.6 |
| | −10.745 | | | | |
| L5 | | 0.95 | | 1.64132 | 42.2 |
| | 21.9103 | | | | |
| L6 | | 4 | | 1.43985 | 94.5 |
| | −15.2898 | | | | |
| | | | 0.067 | | |
| G3 | | | | | |
| | 23.207 | | | | |
| L7 | | 4 | | 1.43985 | 94.5 |
| | −11.965 | | | | |
| L8 | | 0.95 | | 1.73739 | 51.2 |
| | 8.913 | | | | |
| L9 | | 4.2 | | 1.43985 | 94.5 |
| | −40.0981 | | | | |
| | | | 0.166 | | |
| G4 | | | | | |
| | 11.141 | | | | |
| L10 | | 3.9 | | 1.43985 | 94.5 |
| | −60.4312 | | | | |
| | | | 0.123 | | |
| | 7.829 | | | | |
| L11 | | 5.37 | | 1.48794 | 84.1 |
| | −18.836 | | | | |
| L12 | | 2.03 | | 1.61664 | 44.3 |
| | 4.598 | | | | |
| | | | 4.494 | | |
| G5 | | | | | |
| | −4.468 | | | | |
| L13 | | 1.05 | | 1.62247 | 63.2 |
| | −12.6822 | | | | |
| L14 | | 2.51 | | 1.65803 | 39.4 |
| | −6.541 | | | | |
| | | | 96.378 | | |

Both examples concern immersion objectives, which are planapochromatically corrected within a spectral range from 365 nm to 850 nm and can achieve an enlargement of 40× with an intermediate image of 2y'=25 mm.

DETAILED DESCRIPTION OF THE INVENTION

Figure 1:
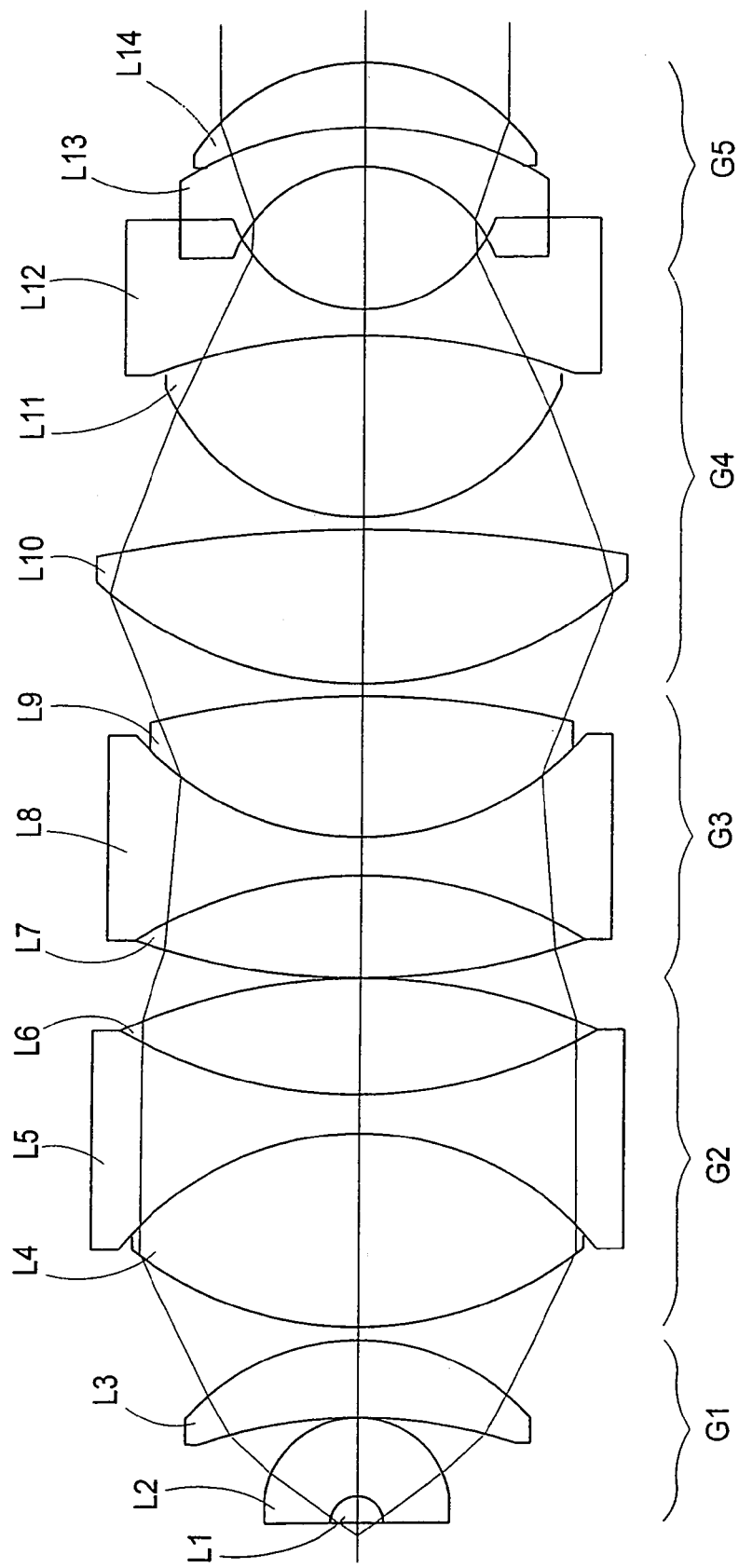
FIG. 1 is a schematic depiction of an exemplary microscope objective in accordance with the present invention.

The two embodiment examples of the invention are described with reference to FIG. 1.

FIG. 1 schematically depicts an exemplary microscope objective. It includes, from the object level:

a first group of lenses G1 with common positive refractive power, consisting of a cemented group of two lenses L1 and L2 with a positive-negative refraction power effect, in which the first optically effective surface that faces the object is made flat and the centers of curvature of the two following optically effective surfaces lie toward to the object level, and further consists of a lens L3 with positive refraction power and centers of curvature likewise located toward the object;

a second group of lenses G2, likewise with common positive refraction power, consisting of three lenses L4, L5 and L6 cemented to each other;

a third group of lenses G3, with common negative refraction power, consisting of three lenses L7, L8 and L9 cemented to each other, in which the face facing the image level has a convex form;

a fourth group of lenses G4, consisting of a lens L10 with positive refraction power and is followed by a group of two lenses L11 and L12 cemented to each other, which have a positive-negative refraction power; and a fifth group of lenses of G5 built as a cemented group, formed by two lenses L13 and L14 with a negative-positive refractive power effect.

In the first embodiment example, the microscope objective is built as an immersion objective, planapochromatically corrected for a spectral range from 365 nm to 850 nm, laid out for an enlargement of 40× with an intermediate image of 2y'=25 mm and configured with the following specified radii r, thicknesses D and distances A in mm, refractive indices $n_e$ with a wavelength of 546,07 Nm and Abbe number $v_e$ aperture 1,2 with a work distance smaller or equal to 0.28 mm (plus the cover glass):

| Object level | r | D | A | ne | $v_e$ |
|---|---|---|---|---|---|
| G1 | | | | | |
| L1 | ∞ | 0.82 | | 1.46008 | 67.7 |
| | −0.892 | | | | |
| L2 | | 3.24 | | 1.88815 | 40.5 |
| | −3.351 | | | | |
| | | | 0.06 | | |
| | −13.143 | | | | |
| L3 | | 2.8 | | 1.53019 | 76.6 |
| | −5.957 | | | | |
| | | | 0.16 | | |
| G2 | | | | | |
| | 11.965 | | | | |
| L4 | | 6.15 | | 1.53430 | 48.6 |
| | −10.291 | | | | |
| L5 | | 0.95 | | 1.64132 | 42.2 |
| | 18.566 | | | | |
| L6 | | 3.87 | | 1.43985 | 94.5 |
| | −15.8495 | | | | |
| | | | 0.06 | | |
| G3 | | | | | |
| | 46.9796 | | | | |
| L7 | | 3.15 | | 1.43985 | 94.5 |
| | −12.496 | | | | |
| L8 | | 0.95 | | 1.73739 | 51.2 |
| | 8.7856 | | | | |
| L9 | | 5.18 | | 1.43985 | 94.5 |
| | −25.2995 | | | | |
| | | | 0.16 | | |

-continued

| Object level | r | D | A | ne | $v_e$ |
|---|---|---|---|---|---|
| G4 | | | | | |
| | 11.8839 | | | | |
| L10 | | 5.1 | | 1.45720 | 89.9 |
| | −43.0888 | | | | |
| | | | 0.122 | | |
| | 7.606 | | | | |
| L11 | | 5.95 | | 1.53019 | 76.6 |
| | −17.151 | | | | |
| L12 | | 0.9 | | 1.64132 | 42.2 |
| | 4.529 | | | | |
| | | | 5.196 | | |
| G5 | | | | | |
| | −4.598 | | | | |
| L13 | | 0.92 | | 1.62247 | 63.2 |
| | −10.82 | | | | |
| L14 | | 2.07 | | 1.62408 | 36.1 |
| | −6.2197 | | | | |
| | | | 126.8 | | |

This first embodiment variation can used with to a tube according to the following table:

| | r | D | A | ne | $v_e$ |
|---|---|---|---|---|---|
| | | | 126.8 | | |
| | 189.417 | | | | |
| TL1 | | 10.9 | | 1.58212 | 53.6 |
| | −189.417 | | | | |
| | | | 60 | | |
| | ∞ | | | | |
| TL2 | | 80 | | 1.51872 | 64.0 |
| | ∞ | | | | |
| | | | 48.2 | | |
| Image plane | | | | | |

In the second embodiment example, the microscope objective according to invention is again designed as an immersion objective, for which the spectral range from 365 nm to 850 nm is corrected planapochromatically, laid out for an enlargement of 40× with an intermediate image of 2y'=25 mm and achieving with the following construction specifications an aperture of 1.1 with a work distance smaller or equal to 0.62 mm (plus the cover glass):

| Object level | r | D | A | ne | $v_e$ |
|---|---|---|---|---|---|
| G1 | | | | | |
| | ∞ | | | | |
| L1 | | 0.86 | | 1.46008 | 67.7 |
| | −1.06 | | | | |
| L2 | | 3.7 | | 1.88815 | 40.5 |
| | −3.813 | | | | |
| | | | 0.06 | | |
| | −15.732 | | | | |
| L3 | | 2.8 | | 1.48794 | 84.1 |
| | −6.778 | | | | |
| | | | 0.16 | | |
| G2 | | | | | |
| | 13.046 | | | | |
| L4 | | 6 | | 1.53430 | 48.6 |
| | −10.745 | | | | |
| L5 | | 0.95 | | 1.64132 | 42.2 |
| | 21.9103 | | | | |

-continued

| Object level | r | D | A | ne | $v_e$ |
|---|---|---|---|---|---|
| L6 | | 4 | | 1.43985 | 94.5 |
| | −15.2898 | | | | |
| | | | 0.067 | | |
| G3 | | | | | |
| | 23.207 | | | | |
| L7 | | 4 | | 1.43985 | 94.5 |
| | −11.965 | | | | |
| L8 | | 0.95 | | 1.73739 | 51.2 |
| | 8.913 | | | | |
| L9 | | 4.2 | | 1.43985 | 94.5 |
| | −40.0981 | | | | |
| | | | 0.166 | | |
| G4 | | | | | |
| | 11.141 | | | | |
| L10 | | 3.9 | | 1.43985 | 94.5 |
| | −60.4312 | | | | |
| | | | 0.123 | | |
| | 7.829 | | | | |
| L11 | | 5.37 | | 1.48794 | 84.1 |
| | −18.836 | | | | |
| L12 | | 2.03 | | 1.61664 | 44.3 |
| | 4.598 | | | | |
| | | | 4.494 | | |
| G5 | | | | | |
| | −4.468 | | | | |
| L13 | | 1.05 | | 1.62247 | 63.2 |
| | −12.6822 | | | | |
| L14 | | 2.51 | | 1.65803 | 39.4 |
| | −6.541 | | | | |
| | | | 96.378 | | |

A tube can be used with the second embodiment variation of the microscope objective, according to the following table:

| | r | D | A | ne | $v_e$ |
|---|---|---|---|---|---|
| | | | 96.378 | | |
| | 147.49 | | | | |
| TL1 | | 6 | | 1.58565 | 46.2 |
| | −273.84 | | | | |
| | | | 14 | | |
| | ∞ | | | | |
| TL2 | | 161.2 | | 1.51872 | 64.0 |
| | ∞ | | | | |
| | | | 41.93 | | |
| Image plane | | | | | |

In comparison with the current state of the art, an apochromatic correction for a large spectral range can be achieved with the present described microscope objective for a relatively low magnification and so the field of view can be favorably extended, since large microscopic object fields can be observed within the range from "ultraviolet" to "infrared", without having to exchange several objectives in each case for smaller spectral ranges.

In comparison with the objective described in U.S. Pat. No. 5,659,425, these advantages are obtained in particular by expanding a luminous beam after the third group of lenses.

REFERENCE SYMBOL LIST

| | |
|---|---|
| G1 | G5 Lenses groups |
| L1 | L14 Lenses |

The invention claimed is:

1. An apochromatically corrected microscope objective, including, from an object end:
   a first group of lenses (G1) having overall positive refractive power, comprising a cemented group having two lenses (L1, L2), including a first lens having positive refractive power and a second lens having a negative refractive power and a further lens (L3) having positive refractive power,
   a second group of lenses (G2) having overall positive refractive power, comprising three cemented lenses (L4, L5, L6),
   a third group of lenses (G3) having overall negative refractive power, comprising three cemented lenses (L7, L8, L9), wherein the side of the third group of lenses that faces the image plane is convex,
   a fourth group of lenses (G4), comprising a lens (L10) with positive refractive power and a cemented group of two lenses (L11, L12) including a third lens having positive refractive power and a fourth lens having negative refraction power, and
   a fifth group of lenses (G5), comprising two lenses (L13, L14) in a cemented group including a fifth lens having negative refractive power and a sixth lens having positive refractive power.

2. A microscope objective according to claim 1, in which the magnitude of the focal length of the second group of lenses (G2) is greater than or about equal to 15 mm.

3. A microscope objective according to claim 1, in which the magnitude of the focal length of the third group of lenses (G3) is greater than or about equal to 20 mm.

4. A microscope objective according to claim 1, in which the magnitudes of the focal lengths of the lenses (L5, L8) are each greater than or about equal to 20 mm.

5. A microscope objective according to claim 1, built as an immersion objective, which is planapochromatically corrected within a spectral range from 365 nm to 850 nm and which makes possible an enlargement of about 40× with an intermediate image of 2 y' about equal to 25 mm and an aperture of about 1.2 with a working distance less than or equal to about 0.28 mm (plus cover glass), meeting the following criteria wherein radii are represented by r, thicknesses are represented by D and distances are represented by A in mm, refractive indices are represented by $n_e$ at a wavelength of 546.07 nm and Abbe numbers are represented by $v_e$ as follows:

| Object level | r | D | A | ne | $v_e$ |
|---|---|---|---|---|---|
| G1 | | | | | |
| L1 | ∞ | 0.82 | | 1.46008 | 67.7 |
| L2 | −0.892 | 3.24 | | 1.88815 | 40.5 |
| | −3.351 | | 0.06 | | |
| | −13.143 | | | | |
| L3 | | 2.8 | | 1.53019 | 76.6 |
| | −5.957 | | 0.16 | | |
| G2 | | | | | |
| L4 | 11.965 | 6.15 | | 1.53430 | 48.6 |
| L5 | −10.291 | 0.95 | | 1.64132 | 42.2 |
| L6 | 18.566 | 3.87 | | 1.43985 | 94.5 |
| | −15.8495 | | 0.06 | | |
| G3 | | | | | |
| L7 | 46.9796 | 3.15 | | 1.43985 | 94.5 |
| L8 | −12.496 | 0.95 | | 1.73739 | 51.2 |
| L9 | 8.7856 | 5.18 | | 1.43985 | 94.5 |
| | −25.2995 | | 0.16 | | |
| G4 | | | | | |
| L10 | 11.8839 | 5.1 | | 1.45720 | 89.9 |
| | −43.0888 | | 0.122 | | |
| L11 | 7.606 | 5.95 | | 1.53019 | 76.6 |
| L12 | −17.151 | 0.9 | | 1.64132 | 42.2 |
| | 4.529 | | 5.196 | | |
| G5 | | | | | |
| L13 | −4.598 | 0.92 | | 1.62247 | 63.2 |
| L14 | −10.82 | 2.07 | | 1.62408 | 36.1 |
| | −6.2197 | | 126.8 | | |

6. A microscope objective according to claim 1, built as an immersion objective, which is planapochromatically corrected within a spectral range from 365 nm to 850 nm and which makes possible an enlargement of about 40× with an intermediate image of 2 y' about equal to 25 mm, and an aperture of about 1.1 with a working distance less than or equal to about 0.62 mm (plus a cover glass), meeting the following criteria wherein radii are represented by r, thicknesses are represented by D and distances are represented by A in mm, refractive indices are represented by $n_e$ with a wavelength of 546.07 nm and Abbe numbers are represented by $v_e$:

| Object level | r | D | A | ne | $v_e$ |
|---|---|---|---|---|---|
| G1 | | | | | |
| L1 | ∞ | 0.86 | | 1.46008 | 67.7 |
| L2 | −1.06 | 3.7 | | 1.88815 | 40.5 |
| | −3.813 | | 0.06 | | |
| | −15.732 | | | | |

-continued

| Object level | r | D | A | ne | v_e |
|---|---|---|---|---|---|
| L3 | | 2.8 | | 1.48794 | 84.1 |
| | −6.778 | | 0.16 | | |
| G2 | | | | | |
| | 13.046 | | | | |
| L4 | | 6 | | 1.53430 | 48.6 |
| | −10.745 | | | | |
| L5 | | 0.95 | | 1.64132 | 42.2 |
| | 21.9103 | | | | |
| L6 | | 4 | | 1.43985 | 94.5 |
| | −15.2898 | | | | |
| | | | 0.067 | | |
| G3 | | | | | |
| | 23.207 | | | | |
| L7 | | 4 | | 1.43985 | 94.5 |
| | −11.965 | | | | |
| L8 | | 0.95 | | 1.73739 | 51.2 |
| | 8.913 | | | | |
| L9 | | 4.2 | | 1.43985 | 94.5 |
| | −40.0981 | | | | |
| | | | 0.166 | | |

-continued

| Object level | r | D | A | ne | v_e |
|---|---|---|---|---|---|
| G4 | | | | | |
| | 11.141 | | | | |
| L10 | | 3.9 | | 1.43985 | 94.5 |
| | −60.4312 | | | | |
| | | | 0.123 | | |
| | 7.829 | | | | |
| L11 | | 5.37 | | 1.48794 | 84.1 |
| | −18.836 | | | | |
| L12 | | 2.03 | | 1.61664 | 44.3 |
| | 4.598 | | | | |
| | | | 4.494 | | |
| G5 | | | | | |
| | −4.468 | | | | |
| L13 | | 1.05 | | 1.62247 | 63.2 |
| | −12.6822 | | | | |
| L14 | | 2.51 | | 1.65803 | 39.4 |
| | −6.541 | | | | |
| | | | 96.378 | | |

\* \* \* \* \*

UNITED STATES PATENT AND TRADEMARK OFFICE
CERTIFICATE OF CORRECTION

PATENT NO. : 7,268,953 B2  
APPLICATION NO. : 11/448592  
DATED : September 11, 2007  
INVENTOR(S) : Manfred Matthae et al.

Page 1 of 1

It is certified that error appears in the above-identified patent and that said Letters Patent is hereby corrected as shown below:

Column 2, Line 10  
After "to", insert -- the --

Column 2, Line 66  
Delete "Nm", insert -- nm --

Column 4, Line 34,  
Delete "Nm", insert -- nm --

Column 5, Line 24,  
Delete "to"

Signed and Sealed this

Eighth Day of July, 2008

JON W. DUDAS  
*Director of the United States Patent and Trademark Office*